(12) United States Patent
Borg et al.

(10) Patent No.: US 12,129,087 B2
(45) Date of Patent: *Oct. 29, 2024

(54) TAMPER-RESISTANT SECURE CONTAINER COVER

(71) Applicant: Oregon Precision Industries, Inc., Eugene, OR (US)

(72) Inventors: Zakary James Borg, Eugene, OR (US); Ronald Lee Mellor, Jr., Eugene, OR (US)

(73) Assignee: OREGON PRECISION INDUSTRIES INC., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,885

(22) Filed: Aug. 4, 2023

(65) Prior Publication Data

US 2023/0373696 A1 Nov. 23, 2023

Related U.S. Application Data

(63) Continuation of application No. 17/124,257, filed on Dec. 16, 2020, now Pat. No. 11,772,863.

(Continued)

(51) Int. Cl.
*B65D 51/20* (2006.01)
*B29C 45/00* (2006.01)
(Continued)

(52) U.S. Cl.
CPC .......... *B65D 51/20* (2013.01); *B29C 45/0001* (2013.01); *B29C 45/0081* (2013.01);
(Continued)

(58) Field of Classification Search
CPC .................. B65D 51/20; B65D 71/50; B65D 2251/0018; B65D 2251/0071;
(Continued)

(56) References Cited

U.S. PATENT DOCUMENTS

| 3,690,499 A | * | 9/1972 | Westfall | ............. | B65D 51/1677 |
| | | | | | 215/253 |
| 3,804,283 A | * | 4/1974 | Frankenberg | ...... | B65D 55/0863 |
| | | | | | 215/351 |

(Continued)

*Primary Examiner* — Steven A. Reynolds
(74) *Attorney, Agent, or Firm* — Alleman Hall & Tuttle LLP

(57) ABSTRACT

A secure container cover for a container and manufacturing method therefore are provided. The secure container cover includes an integrally molded body with an annular structure and a side wall. The annular structure includes a central void defined by an intermediate perimeter, and a graspable loop integrally formed with the annular structure is configured to reside within the central void. A tear initiation point is formed where the graspable loop joins the annular structure. A thin section extends from the tear initiation point to a bottom edge of the side wall. The graspable loop is detachably connected to the annular structure at a bridging section. The bridging section is configured to break when an upward biasing force is applied to the graspable loop, and the side wall is configured to separate along the thin section when the graspable loop is pulled away from the body of the secure container cover.

20 Claims, 7 Drawing Sheets

Related U.S. Application Data

(60) Provisional application No. 62/975,145, filed on Feb. 11, 2020.

(51) Int. Cl.
*B65D 71/50* (2006.01)
*B29K 23/00* (2006.01)
*B29L 31/56* (2006.01)

(52) U.S. Cl.
CPC ........ *B65D 71/50* (2013.01); *B29K 2023/065* (2013.01); *B29L 2031/565* (2013.01); *B65D 2251/0018* (2013.01); *B65D 2251/0071* (2013.01); *B65D 2251/02* (2013.01)

(58) Field of Classification Search
CPC ............ B65D 2251/02; B65D 51/1677; B65D 55/0683; B29C 45/001; B29C 45/0081
USPC ......... 206/151; 215/253, 254, 304, 305, 274
See application file for complete search history.

(56) References Cited

U.S. PATENT DOCUMENTS

| | | | | |
|---|---|---|---|---|
| 3,866,782 | A * | 2/1975 | Westfall | B65D 51/145 |
| | | | | 215/253 |
| 4,018,353 | A * | 4/1977 | Marklein | B65D 51/145 |
| | | | | 215/253 |
| 5,080,245 | A * | 1/1992 | Conard | B65D 51/002 |
| | | | | 215/254 |
| 8,393,484 | B2 * | 3/2013 | Benedetti | B65D 51/228 |
| | | | | 215/261 |
| 11,772,863 | B2 * | 10/2023 | Borg | B65D 55/0863 |
| | | | | 206/151 |
| 2005/0092750 | A1 * | 5/2005 | Lohrman | B65D 47/36 |
| | | | | 215/254 |
| 2008/0224489 | A1 * | 9/2008 | Borg | B65D 71/50 |
| | | | | 294/87.28 |
| 2010/0200534 | A1 * | 8/2010 | Frishman | B65D 41/12 |
| | | | | 215/253 |
| 2012/0073997 | A1 * | 3/2012 | Borg | B65D 71/50 |
| | | | | 206/386 |

* cited by examiner

TAMPER-RESISTANT SECURE CONTAINER COVER

CROSS REFERENCE TO RELATED APPLICATIONS

This application claims priority to U.S. Provisional Patent Application Ser. No. 62/975,145, filed Feb. 11, 2020 and entitled TAMPER-PROOF SECURE CONTAINER COVER, and is a continuation of U.S. patent application Ser. No. 17/124,257, filed Dec. 16, 2020 and entitled TAMPER-RESISTANT SECURE CONTAINER COVER, the entirety of both of which are hereby incorporated herein by reference for all purposes.

BACKGROUND

Container covers are used with containerized products sold in retail environments to inhibit the opening of or tampering with a container prior to purchase, and/or to secure a plurality of containers into a sales unit. However, container covers generally serve as deterrents, as one typically need only unscrew the container cover, or release the container from the container cover to gain access to a lever that is simply lifted to open the container via a pre-scored section in the container top. In some situations, particularly with containers having potentially hazardous or age-restricted contents, it may be desirable to prohibit a container from being easily opened. A challenge exists in engineering a container cover that prevents an unintended user from opening the container, but still allows an intended user to easily access the contents of the container.

SUMMARY

To address the above issues, a secure container cover and manufacturing method for a secure container cover are disclosed herein. According to a first aspect, a secure container cover for restricting access to an opening of a container comprises an integrally molded body including an annular structure and a side wall. The annular structure includes a central void defined by an intermediate perimeter, and a graspable loop integrally formed with the annular structure is configured to reside within the central void. A tear initiation point is formed where the graspable loop joins the annular structure, and a thin section extends from the tear initiation point to a bottom edge of the side wall. The thin section is defined by at least one channel formed in the body of the secure container cover. A thickness of the thin section is thinner than a thickness of the annular structure and thinner than a thickness of the side wall. The graspable loop is detachably connected to the annular structure at a bridging section, and the bridging section is configured to break when an upward biasing force is applied to the graspable loop. The side wall is configured to separate along the thin section when the graspable loop is pulled away from the body of the secure container cover. A potential benefit of this configuration is that access to potentially hazardous or age-restricted contents of the container may be prevented.

In this aspect, the thin section may be a first thin section, the tear initiation point may be a first tear initiation point, and a second thin section may extend from a second tear initiation point to a tear termination point on the side wall. A potential benefit of this configuration is that an intended user can release the container by pulling on the graspable loop.

In this aspect, the tear termination point may be adjacent to a protrusion in a tear direction, and the protrusion may be formed on the side wall adjacent to the bottom edge of the side wall. A potential benefit of this configuration is that the graspable loop does not detach from the secure container cover after release of the container. As such, no small bits of waste are created, and the secure container cover may be recycled as a single unit.

In this aspect, the first and second thin sections may form a tear section therebetween, and the tear section may be arranged equidistantly between two side wall voids. A potential benefit of this configuration is that the integrity of the secure container may be maintained until an intended user releases the container from the secure container cover.

In this aspect, the first and second thin sections may be arranged parallel to one another. A potential benefit of this configuration is that the shearing force applied when a user applied when a user pulls the graspable loop away from the body of the secure container cover is maximized.

In this aspect, the side wall may be formed of side wall portions separated by side wall voids, a respective flange may be positioned proximate a bottom end of each side wall void, and the flanges may be collectively configured to engage with a lip of the container to prevent an axial displacement of the secure container cover from a container. A potential benefit of this configuration is that the container remains engaged with the secure container cover until a user opens the secure container cover via separating the thin sections.

In this aspect, the side wall portions may be connected by the annular structure. A potential benefit of this configuration is that the secure container cover is strong and durable.

In this aspect, a bottom surface of the graspable loop may be in a plane with a top surface of the annular structure, and a top surface of the graspable loop protrudes above a top surface of the annular structure. A potential benefit of this configuration is that when a downward force is applied to one side of the loop, the other side of the loop raises up. This configuration permits an intended user to grasp the loop and initiate removal of the secure container cover.

In this aspect, a secure container carrier may comprise a plurality of secure container covers, and each secure container cover of the plurality of secure container covers may be joined to an adjacent secure container cover via a bridge. A potential benefit of this configuration is that a plurality of containers individually engaged with respective secure container covers may be marketed, distributed, and/or transported in groups.

In this aspect, a top surface of the annular structure may include a plurality of arcuate ribs arranged around an outer perimeter of the top surface. A potential benefit of this configuration is that a second container may be stacked on top of a first container engaged with the secure container cover, and the ribs prevent horizontal displacement of the second container from the first container. Additionally, the ribs may stabilize stacks of empty secure container covers during the manufacturing process, thereby allowing them to be efficiently indexed into a queue in an application machine for applying to respective containers.

In this aspect, the side wall may be configured to extend down a side surface of a container. Potential benefits of this configuration are that a lip of the container is protected, and the container remains engaged with the secure container cover until a user opens the secure container cover via separating the thin sections.

In this aspect, the body of the secure container cover may be formed of post-consumer recycled high density polyethylene. Potential advantages of this configuration are that the secure container cover is lightweight yet durable, does not require the use of specialized plastic during manufacturing, can be molded from post-consumer recycled material, and may be recycled after use.

In another aspect, a manufacturing method for a secure container cover is provided. The manufacturing method includes integrally molding a body including an annular structure and a side wall, forming in the annular structure a central void defined by an intermediate perimeter, forming a graspable loop integrally with the annular structure, the graspable loop being configured to reside within the central void, forming a tear initiation point where the graspable loop joins the annular structure, forming a thin section to extend from the tear initiation point to a bottom edge of the side wall, forming the graspable loop to be detachably connected to the annular structure at a bridging section, configuring the bridging section to break when an upward biasing force is applied to the graspable loop, and configuring the side wall to separate along the thin section when the graspable loop is pulled away from the body of the secure container cover. A potential benefit of this configuration is that access to potentially hazardous or age-restricted contents of the container may be prevented.

In another aspect, a secure container system restricting access to an opening of a container is provided. The secure container system comprises a container and a secure container cover. The secure container comprises an integrally molded body including an annular structure and a side wall. The annular structure includes a central void defined by an intermediate perimeter, and a graspable loop integrally formed with the annular structure is configured to reside within the central void. A tear initiation point is formed where the graspable loop joins the annular structure. A first thin section extends from the tear initiation point to a bottom edge of the side wall, and a second thin section extends from a second tear initiation point to a tear termination point on the side wall. The graspable loop is detachably connected to the annular structure at a bridging section. The bridging section is configured to break when an upward biasing force is applied to the graspable loop, and the side wall is configured to separate along the thin section when the graspable loop is pulled away from the body of the secure container cover. The tear termination point prevents the graspable loop from detaching from the secure container cover upon release of the container. Potential benefits of this configuration are that access to potentially hazardous or age-restricted contents of the container may be prevented, and the secure container cover remains in one piece after removal of the container. As such, no additional waste is created, and the secure container cover may be recycled as a single unit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Selected embodiments of the present disclosure will now be described with reference to the accompanying drawings. It will be apparent to those skilled in the art from this disclosure that the following descriptions of the embodiments of the disclosure are provided for illustration only and not for the purpose of limiting the disclosure as defined by the appended claims and their equivalents.

The prevention of accidental ingestion of a potentially dangerous liquid may depend upon the security of the container cover. For example, beverages with high levels of caffeine and/or beverages containing psychoactive components can be potentially deadly for some people. Further, as *cannabis* beverages infused with THC, CBD, and other cannabinoids gain popularity and become more widely distributed, the need to secure containers from being opened by an unintended user, such as a child, has become a necessity. A secure container cover may also serve to prevent a user from unintentionally drinking an infused beverage, as the container may be mistaken for a typical beverage container.

First Embodiment

Figure 1:
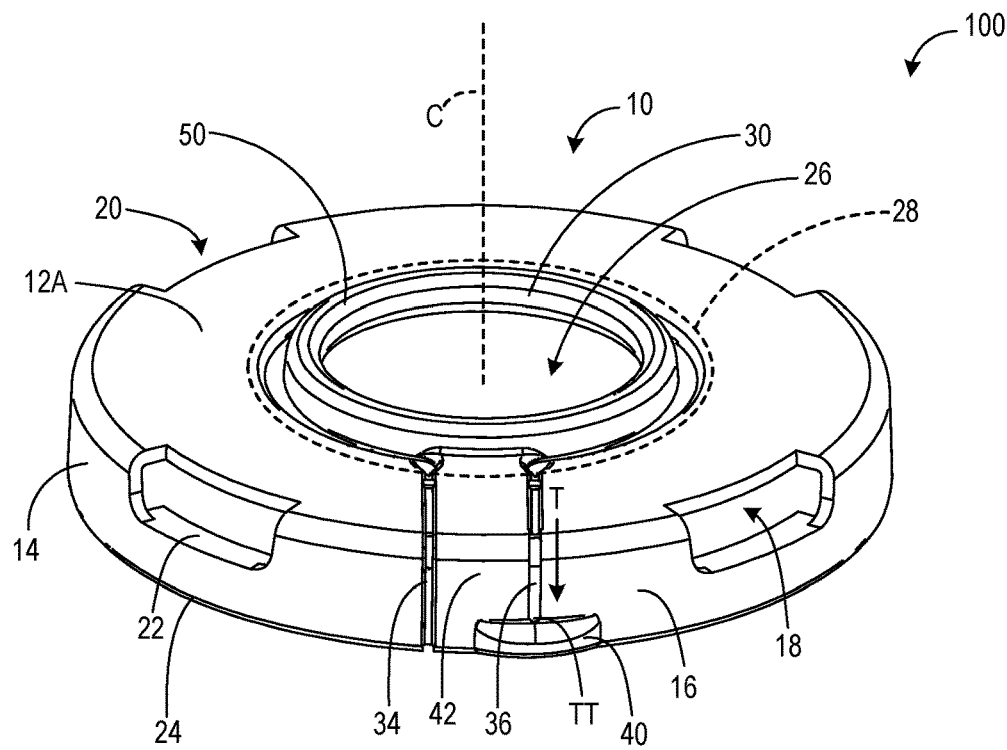
FIG. 1 shows a top perspective view of a secure container cover according to one embodiment of the present description.
Figure 2:
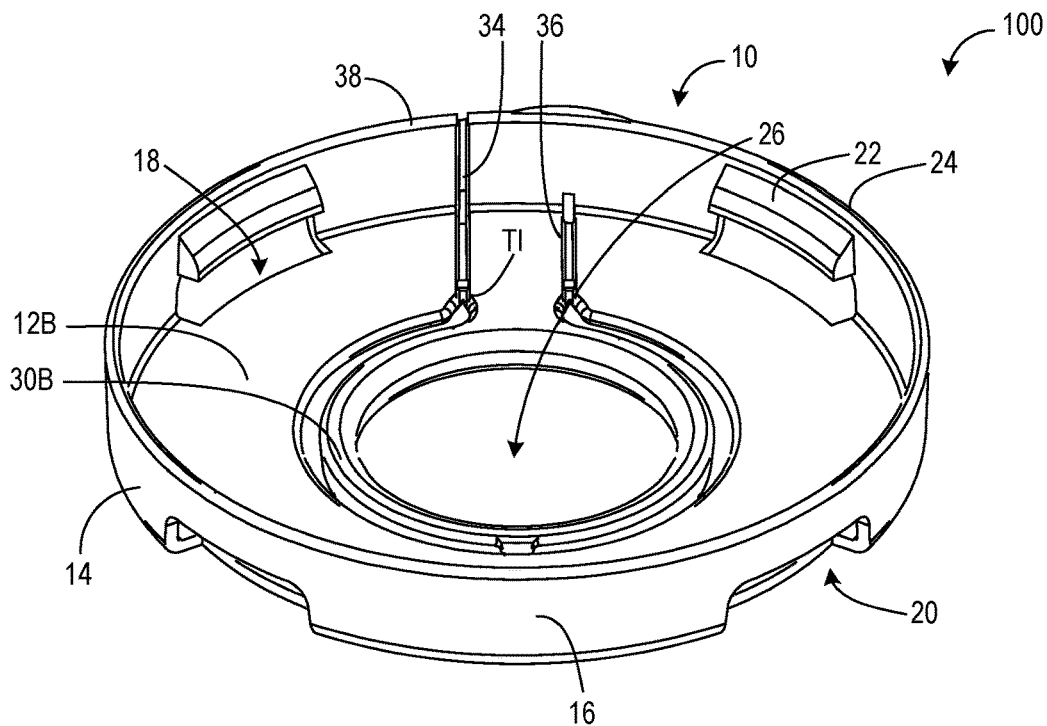
FIG. 2 shows a bottom perspective view of the secure container cover of FIG. 1.

Turning to the figures, FIGS. 1 and 2 illustrate top and bottom perspective views, respectively, of one embodiment of a secure container cover 100 for restricting access to an opening of a container. The secure container cover 100 may comprise an integrally molded body 10 including an annular structure 12 and a side wall 14. The side wall 14 may be formed of side wall portions 16 separated by side wall voids 18. The annular structure 12 may include notched voids 20 continuous with respective side wall voids 18, and the side wall portions 16 may be connected by the annular structure 12. A respective flange 22 may be positioned proximate a bottom end 24 of each side wall void 18. The flanges 22 may be collectively configured to engage with a bottom of a lip of the container to prevent an axial displacement of the secure container cover 100 from the container. In the illustrated embodiment, the secure container cover 100 includes four side wall voids 18, each with a respective flange 22, arranged equidistant from one another around the body 10 of the secure container cover 100. However, it will be appreciated that the secure container cover 100 may include more or fewer side wall voids 18 and respective flanges 22, and the side wall voids 18 and flanges 22 may be arranged non-equidistantly.

Figure 3:
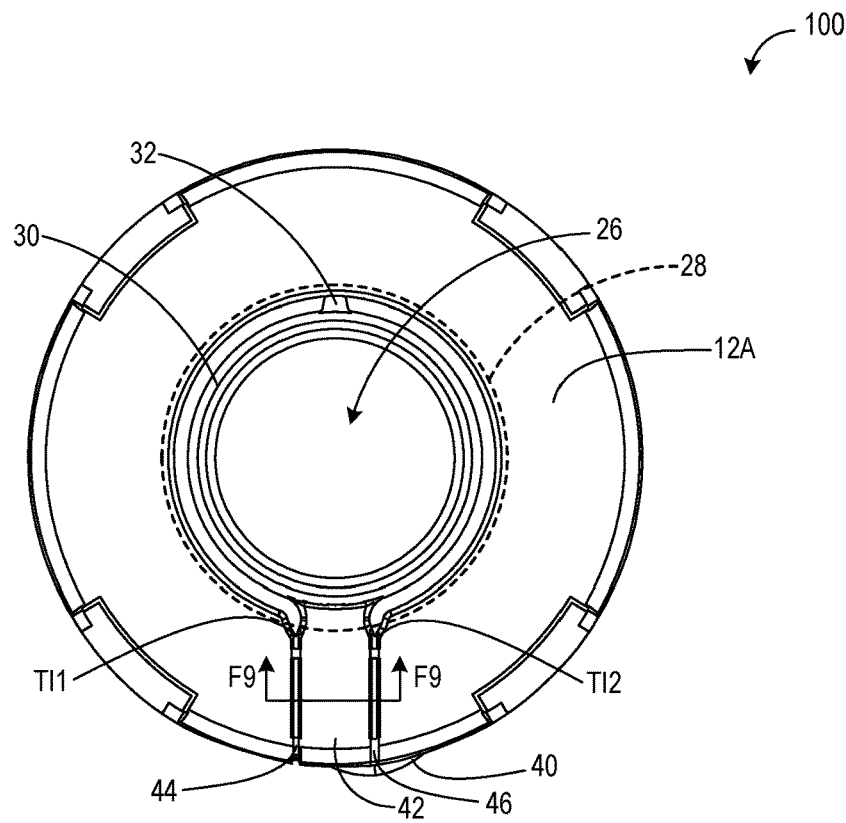
FIG. 3 shows a top view of the secure container cover of FIG. 1.
Figure 4:
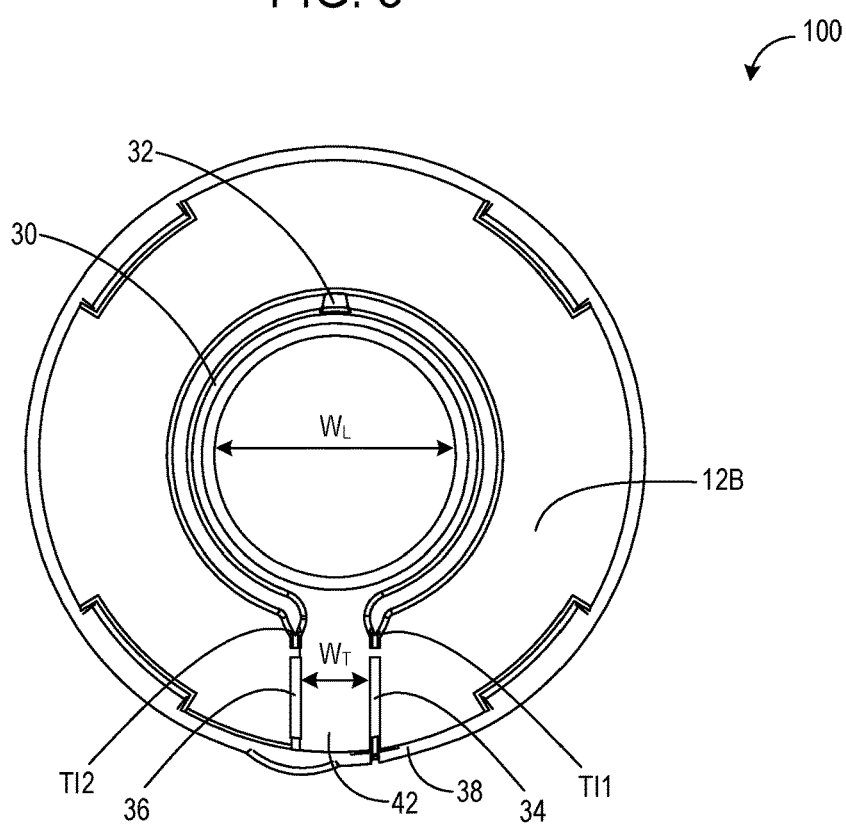
FIG. 4 shows a bottom view of the secure container cover of FIG. 1.

Turning to FIGS. 3 and 4, a top view and a bottom view, respectively, of the secure container cover 100 are shown. The annular structure 12 may include a central void 26 defined by an intermediate perimeter 28. The central void 26 may be round in shape, for example circular, as shown in FIG. 3. Other shapes for the central void 26 are possible. A graspable loop 30 is integrally formed with the annular structure 12 and may be configured to reside within the central void 26, and may be flush with or recessed relative to a top surface 12A of the annular structure 12, and a gap is typically formed between an outer perimeter of the graspable loop 30 and an inner perimeter of the central void 26. In other configurations, the graspable loop 30 may stand slightly proud of the top of the annular structure. The graspable loop is also round in shape, for example circular, although other shapes are possible. The graspable loop has a void formed within itself and is typically of constant cross section along its curving perimeter, except where attached to the annular structure. The graspable loop 30 may be detachably connected to the annular structure 12 at a bridging section 32. When attached to the annular structure 12 at the bridging section 32, the graspable loop 30 remains in a horizontal configuration either recessed or flush with the top of the annular structure 12, which minimizes the risk of catching on something during transit, for example, that could lead to accidental removal of the secure container cover 100. Further, the recessed or flush position of the graspable loop 30 ensures that it does not interfere with stacking multiple containers engaged in secure container covers 100. While one bridging section 32 is illustrated, it will be appreciated that the graspable loop 30 may be detachably connected to the annular structure 12 at two or more bridging sections 32.

Returning to FIG. 2, a tear initiation point TI is formed where the graspable loop 30 joins the annular structure 12. The tear initiation point TI may be a branched structure adjacent to a thin section 34. The thin section 34 is defined by at least one channel formed in the body 10 of the secure container cover 100. A thickness of the thin section 34 is thinner than a thickness of the annular structure 12 and thinner than a thickness of the side wall 14. As shown in FIG. 3 with reference to FIG. 1, the thin section 34 may extend from the tear initiation point TI to a bottom edge 38 of the side wall 14. The secure container cover 100 is configured to separate along the thin section 34 during a tearing operation when a user pulls the graspable loop 30 away from a container engaged with the secure container cover 100.

The thin section 34 may be a first thin section 34, and the tear initiation point TI may be a first tear initiation point TI1. A second thin section 36 may extend from a second tear initiation point TI2 to a tear termination point TT, as illustrated in FIG. 1. The separation of the second thin section 36 from the body 10 of the secure container cover 100 is configured to stop at the tear termination point TT, thereby preventing the graspable loop 30 from detaching from the body 10 of the secure container cover 100 during a tearing operation by a user to release a container. With this configuration, the secure container cover 100 remains in one piece that may be recycled or properly disposed. Remaining in one piece is preferable for recycling because combination sorter equipment that sorts a combined stream of various recyclables can more effectively sort larger pieces of plastic. As shown in the embodiment illustrated in FIG. 1, the tear termination point TT may be configured as a protrusion 40 in a tear direction T. The protrusion 40 may be formed on the side wall 14 adjacent to the bottom edge 38 of the side wall 14. The protrusion 40 is configured as an area of increased material thickness that protrudes in an radial direction from the body 10 of the secure container cover 100 with respect to a center axis C. A width of the protrusion 40 may be in a range of 75% to 125% of a distance between the first and second thin sections 34, 36, and is preferably substantially the same as the distance between the first and second thin sections 34, 36. A thickness of the protrusion 40 may be in a range of 75% to 125% of a thickness of the side wall 14 of the secure container cover 100, and in one embodiment is substantially the same as the thickness of the side wall 14 of the secure container cover 100, thereby doubling the overall thickness of the material in the location of the side wall 14 and protrusion 40 as compared to the thickness of the side wall 14 itself. As described below with reference to FIG. 7, a height $H_P$ of the protrusion 40 may be in a range of 20% to 50% of a height $H_W$ of the side wall 14. A shape of the protrusion 40 is preferably curved, with an apex of the curve centered at the tear termination point TT where the second thin section 36 ends. As such, the thickest part of the protrusion 40 is configured to withstand the tearing force thus far applied and thereby cause forced termination of the tearing operation. Put another way, the tearing force required to tear through the protrusion greatly exceeds the tearing force required to tear along the thin section, posing an effective barrier to the tear operation tearing the structure completely into two parts.

Alternatively, the tear termination point TT may be a discontinuation of the second thin section 36 in the absence of a protrusion. While the tear termination point TT is arranged on the side wall 14 in the embodiment illustrated in FIGS. 3 and 4, it will be appreciated that the tear termination point TT may be arranged at another location of the body 10 of the secure container cover 100, such as on the annular structure 12 at a position adjacent to the side wall 14.

As illustrated in FIGS. 1-4, the first and second thin sections 34, 36 are substantially straight and parallel to one another and form a tear section 42 therebetween. The parallel configuration of the tear section 42 maximizes the shearing force applied when the user pulls the graspable loop 30 away from the body 10 of the secure container cover 100 in the tearing operation. However, it will be appreciated that either or both of the first and second thin sections 34, 36 may be alternatively arranged at an angle with respect to the first and second tear initiation points TI1, TI2, respectively, of the graspable loop 30 and/or to one another. For example, the thin sections 34, 36 may be parallel for a distance and then one thin section may bend away from the other thin section in a non-parallel orientation to thereby inhibit tearing.

As shown in FIG. 4, a width W T of the tear section 42 may be in a range of 20% to 50% of a width W L of the graspable loop 30. In the embodiments described herein, the tear section 42 is arranged equidistantly between two side wall voids 18 and their respective flanges 22. With this configuration, the forces imparted by the user during the tearing operation are equally borne by each of the flanges 22, which stabilizes the secure container cover 100 as it is being removed from a container. Alternatively, the tear section 42 could be located closer to one of the side wall voids 18 and its respective flange 22. Also, as described above, the secure container cover 100 could be configured to have more or fewer flanges 22 than four.

As shown in FIG. 3 with reference to FIGS. 1 and 2, the first thin section 34 may include a first void 44, and the second thin section may include a second void 46. In the illustrated embodiment, the voids 44, 46 are arranged in the thin sections 34, 36 where the annular structure 12 meets the side wall 14. However, it will be appreciated that the voids 44, 46 may be arranged in an alternate location in the thin sections 34, 36, such as in the annular structure 12, the side wall, or a combination thereof. Further, there may be more than one void formed in each of the first and second thin sections 34, 36, or the voids may be absent from one or both of the thin sections 34, 36.

Figure 7:
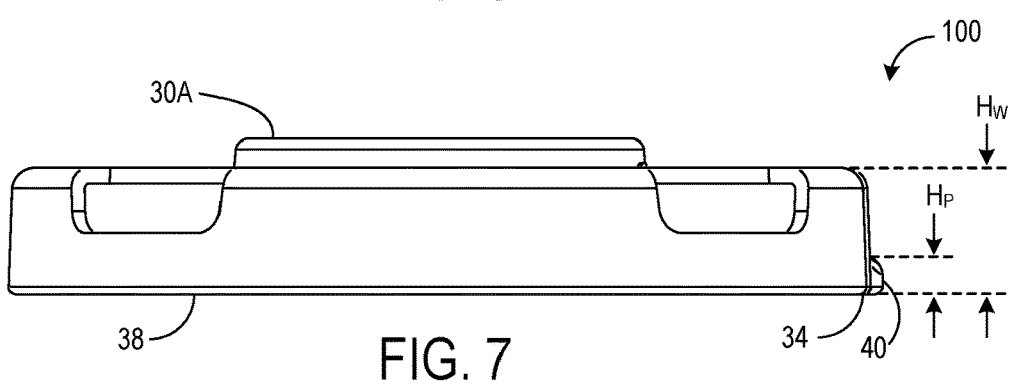
FIG. 7 shows a left side view of the secure container cover of FIG. 1.
Figure 8:
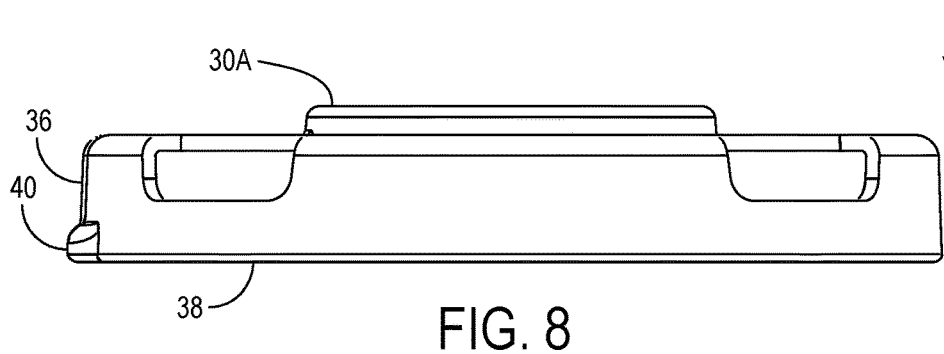
FIG. 8 shows a right side view of the secure container cover of FIG. 1.

FIGS. 5, 6, 7, and 8 show front, rear, left side, and right side views of the secure container cover 100, respectively. FIGS. 5 to 8 are substantially identical, with the difference being that the first and second thin sections 34, 36 and the protrusion P are visible at the bottom edge 38 of the side wall 14 in FIG. 5. The first thin section 34 and the protrusion P are partially visible in the left side view of FIG. 7. Similarly, the second thin section 36 and the protrusion P are partially visible in the right side view of FIG. 8. As shown in FIG. 7, a height $H_P$ of the protrusion 40 may be in a range of 20% to 50% of a height $H_W$ of the side wall 14.

The thin section 34, 36 may form respective thin sections in the body 10 of the secure container cover 100. As described above, the thin sections 34, 36 are defined by at least one channel formed in the body 10 of the secure container cover 100 and have a thickness that is thinner than a thickness of the annular structure 12 and thinner than a thickness of the side wall 14.

Figure 9:
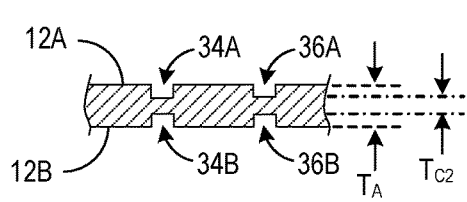
FIG. 9 shows a section view of the secure container cover of FIG. 1 taken along line F9-F9 of FIG. 3.

FIG. 9 shows a section view of the annular structure 12, as indicated by line F9-F9 of FIG. 3. As shown, the first thin section 34 may be defined by two channels 34A, 34B formed in the top and bottom surfaces 12A, 12B of the annular structure 12. Likewise, the second thin section 36 may be defined by two channels 36A, 36B formed in the top and bottom surfaces 12A, 12B of the annular structure 12. It will be appreciated that the first and second thin sections 34, 36 continue from the annular structure 12 to the side wall 14, with respective voids 44, 46 formed in the thin sections 34, 36 where the annular structure 12 meets the side wall 14.

Figure 5:
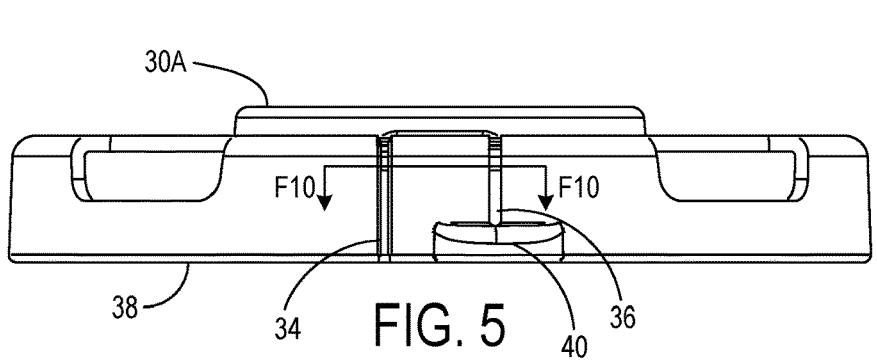
FIG. 5 shows a front view of the secure container cover of FIG. 1.
Figure 6:
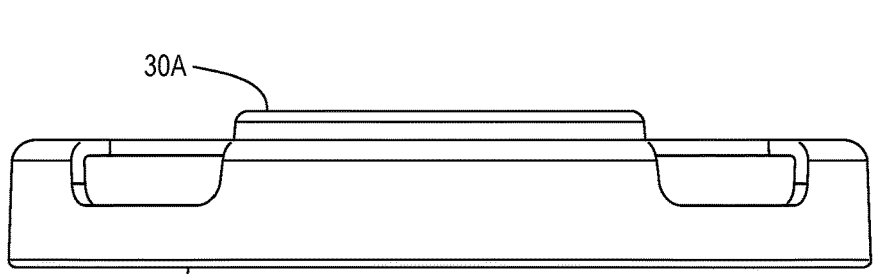
FIG. 6 shows a rear side view of the secure container cover of FIG. 1.
Figure 10:
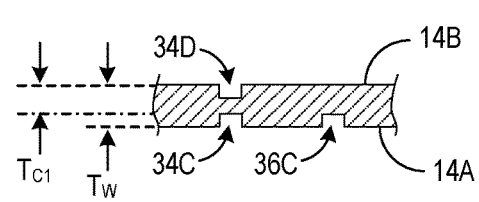
FIG. 10 shows a section view of the secure container cover of FIG. 1 taken along line F10-F10 of FIG. 5.

FIG. 10 shows a section view of the side wall 14, as indicated by line F10-F10 of FIG. 5. As with the annular structure 12, the first thin section 34 may be defined by two channels 34C, 34D formed in the outer and inner surfaces 14A, 14B of the side wall 14. However, the second thin section 36 may be defined by one channel 36C formed in the outer surface 14A of the side wall 14, without a channel formed in the inner surface 14B of the side wall. With this configuration, the tearing operation is slowed at least on the second thin section 36 in the side wall 14, which prevents a user from tearing through the tear termination point TT and separating the graspable loop 30 from the body 10 of the secure container cover 100.

Additionally or alternatively, the first and second thin sections 34, 36 may both be defined by a respective single channel 34A, 36A on the top surface 12A of the annular structure 12, a respective single channel 34B, 36B on the bottom surface 12B of the annular structure 12, or one or the other of the first and thin sections 34, 36 may be defined by channels formed on one or the other or both of the top and bottom surfaces 12A, 12B of the annular structure 12, as well as on one or the other or both of the outer and inner surfaces 14A, 14B of the side wall 14.

As shown in FIGS. 9 and 10, a thickness $T_{C2}$ of the first and second thin section 34, 36 defined by two channels (dash dot line) may be in a range of 20% to 50% of a thickness $T_A$ of the annular structure 12 or a thickness $T_W$ of the side wall 14. Similarly, a thickness $T_{C1}$ of the second thin section 36 on the side wall 14 that is defined by one channel 36C (dash dot line to dashed line) may be in a range of 50% to 80% of a thickness $T_A$ of the annular structure 12 or a thickness $T_W$ of the side wall 14. While the thickness $T_A$ of the annular structure 12 and the thickness $T_W$ of the side wall 14 (dashed line) are illustrated as equal in FIGS. 9 and 10, it will be appreciated that the thickness $T_A$ of the annular structure 12 may be greater than or less than the thickness $T_W$ of the side wall 14. With reference to FIG. 2, a bottom surface 30B of the graspable loop 30 may be in a plane with the top surface 12A of the annular structure 12. Accordingly, as shown in FIG. 1 and FIGS. 5 to 8, a top surface 30A of the graspable loop 30 may protrude above the top surface 12A of the annular structure 12. With this configuration, when a downward force is applied to one side of the graspable loop 30, the other side of the graspable loop 30 raises up, thereby permitting an intended user to grasp the graspable loop 30 and initiate removal of the secure container cover 100 from a container. Alternatively, in some configurations, the top surface 30A of the graspable loop 30 may be in a plane with the top surface 12A of the annular structure 12.

The bridging section 32 may be configured to break when an upward biasing force is applied to the graspable loop 30, thereby separating the graspable loop 30 from the annular structure 12. As the graspable loop 30 is pulled away from the body 10 of the secure container cover 100 in a tearing operation, the tear section 42 may be configured to separate from the annular structure 12 along the thin sections 34, 36. The separation of the tear section 42 from the annular structure 12 may release the container from the secure container cover 100 and permit access to an opening on the secure container cover 100. It will be appreciated that the force and manual dexterity required to lift and separate the graspable loop 30 from the annular structure 12 and to separate the side wall 14 along the thin section 34 by pulling of the graspable loop 30 is designed to be limited to the strength of an adult to thereby prevent a child from releasing the container from the secure container cover 100. The removal of the secure container cover 100 from the container may also be indicative of tampering, as it shows that an unintended user may have had access to the container.

Figure 11:
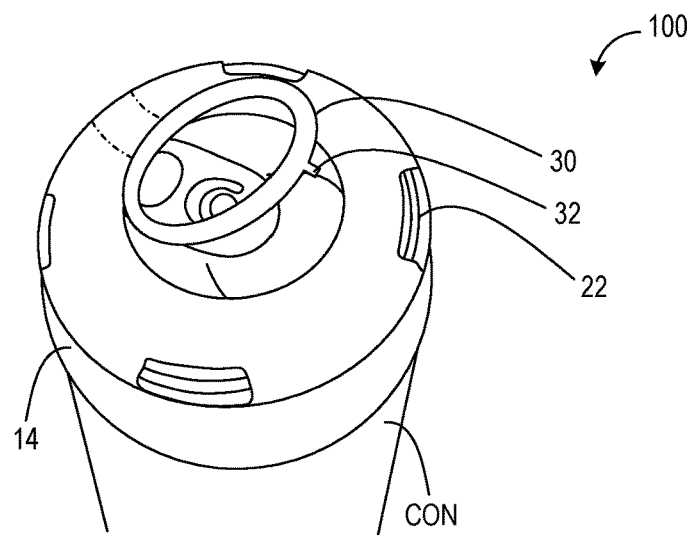
FIG. 11 shows separation of a graspable loop from an annular surface of the secure container cover of FIG. 1 engaged with a container.
Figure 12:
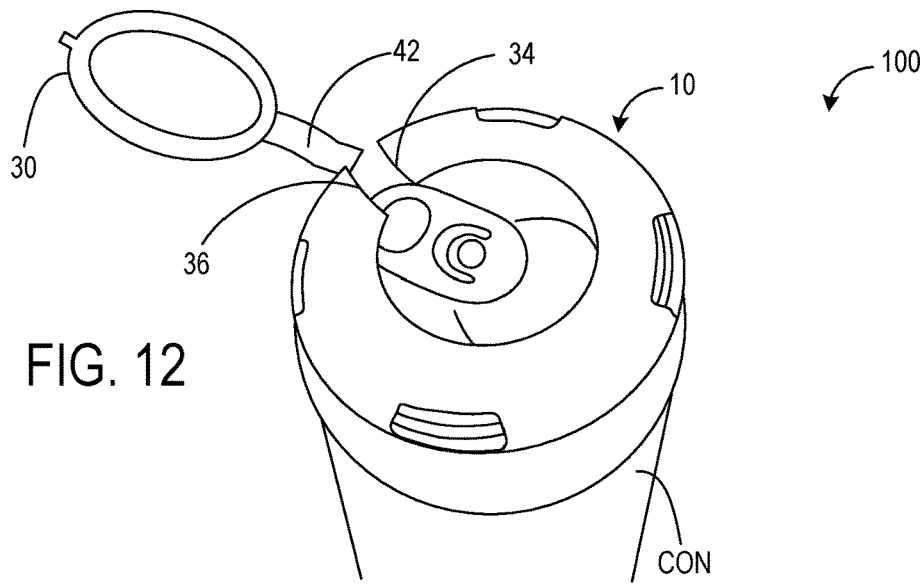
FIG. 12 shows separation of a side wall of the secure container cover of FIG. 1 engaged with a container.
Figure 13:
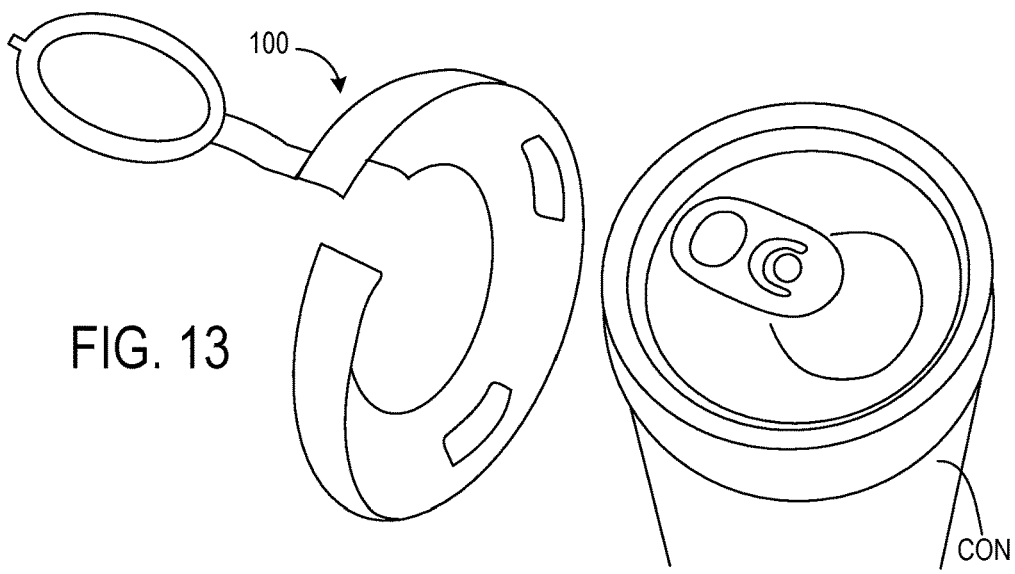
FIG. 13 shows full detachment of the secure container cover of FIG. 1 from a container.

Turning to FIGS. 11 to 13, an example of removing the secure container cover 100 from a container CON is illustrated. When attached, the side wall 14 of the secure container cover 100 may be configured to extend down a side of the container CON, as shown in FIGS. 11 and 12. This aspect contributes to ensuring that the secure container cover 100 remains engaged with the container CON, as the flanges 22 can be formed to be thick and resistant to releasing the container CON from the secure container cover 100 without using the graspable loop 30 to separate the side wall 14.

FIG. 11 shows the secure container cover 100 after the upward biasing force has been applied to the graspable loop 30 to detach the bridging section 32 from the annular structure 12, as described above. In FIG. 12, the graspable loop 30 has been pulled away from the body 10 of the secure container cover 100, resulting in separation of the side wall 14 along the first thin section 34. As described above and shown in FIG. 12, the tearing operation along the second thin section 36 is configured to stop to the tear termination point TT on the annular structure 12 adjacent to the side wall 14. After the side wall 14 is separated, the secure container cover 100 can be removed from the container CON, as shown in FIG. 13, to permit the user to access the opening of the container CON.

Second Embodiment

Figure 14:
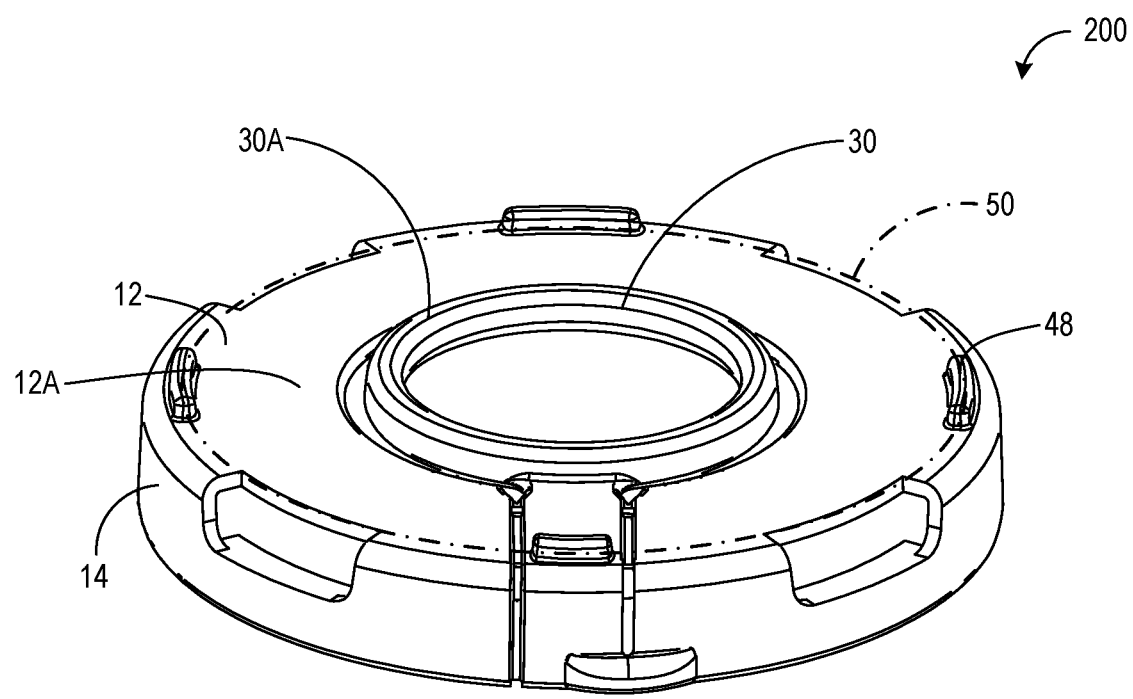
FIG. 14 shows a top perspective view of a secure container cover according to a second embodiment of the present description.

Looking now at FIG. 14, a second embodiment of a secure container cover 200 is illustrated. Since the secure container cover 200 according to the second embodiment is generally similar to that of the secure container cover 100 according to the first embodiment, the detailed description thereof is abbreviated for the sake of brevity. It is to be noted that like parts are designated by like reference numerals throughout the detailed description and the accompanying drawings.

FIG. 14 illustrates a top perspective view of the second embodiment of the secure container cover 200. As shown, the top surface 42 of the annular structure 12 may include a plurality of arcuate ribs 48 arranged around an outer perimeter 50 (indicated by the dot dash line) of the annular structure 12. The arcuate ribs 48 may stabilize the second container stacked on top of the first container engaged with the secure container cover 200 by preventing horizontal displacement of the bottom of the second container from the secure container cover 200. Additionally, the arcuate ribs 48 may stabilize empty secure container covers 200 in a stacked formation, which facilitates indexing stacks of secure container covers 200 into a queue in an application machine that applies the secure container covers 200 to respective containers.

In the embodiments depicted in FIGS. 1-14 the secure container cover 100, 200 is configured as a single secure container cover. However, it may be desirable to join a plurality of securely covered containers together as a secure container carrier. This configuration permits a manufacturer or distributor to offer products in a specific number or a variety of numbers, depending on the context. For example, certain products may be offered as a twin-pack, while other products are offered as a four-pack or a six-pack.

Figure 15:
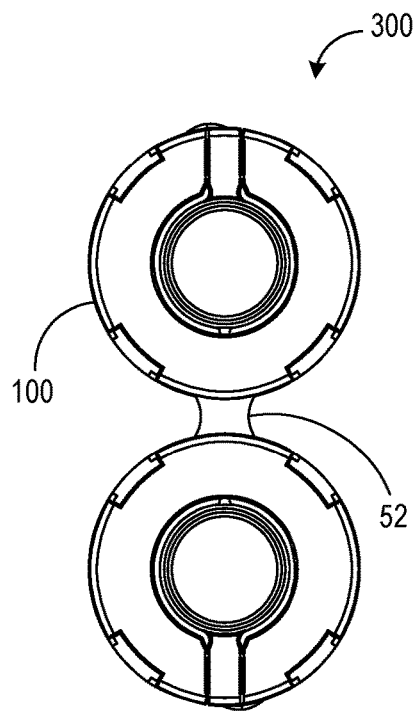
FIG. 15 shows a top view of two secure container covers joined together to form a secure container carrier.
Figure 16:
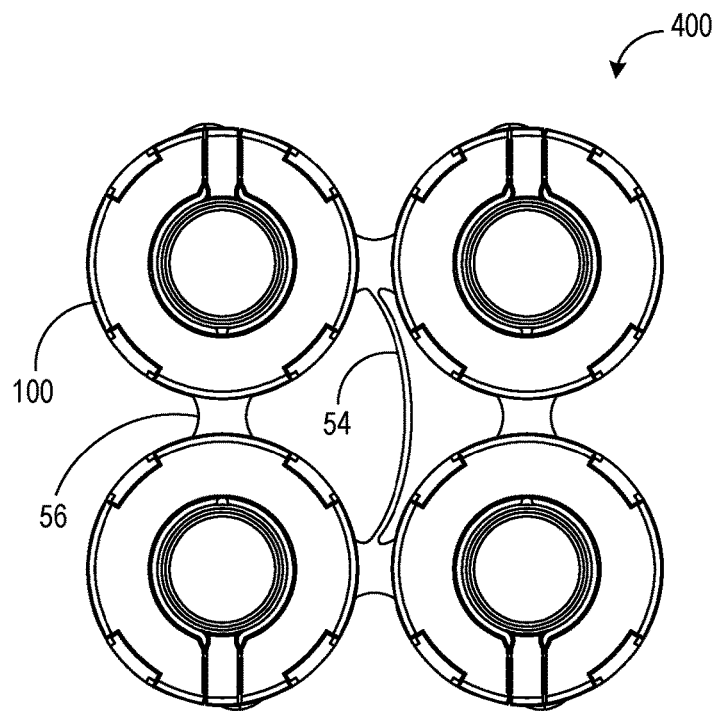
FIG. 16 shows a top view of four secure container covers joined together to form a secure container carrier.
Figure 17:
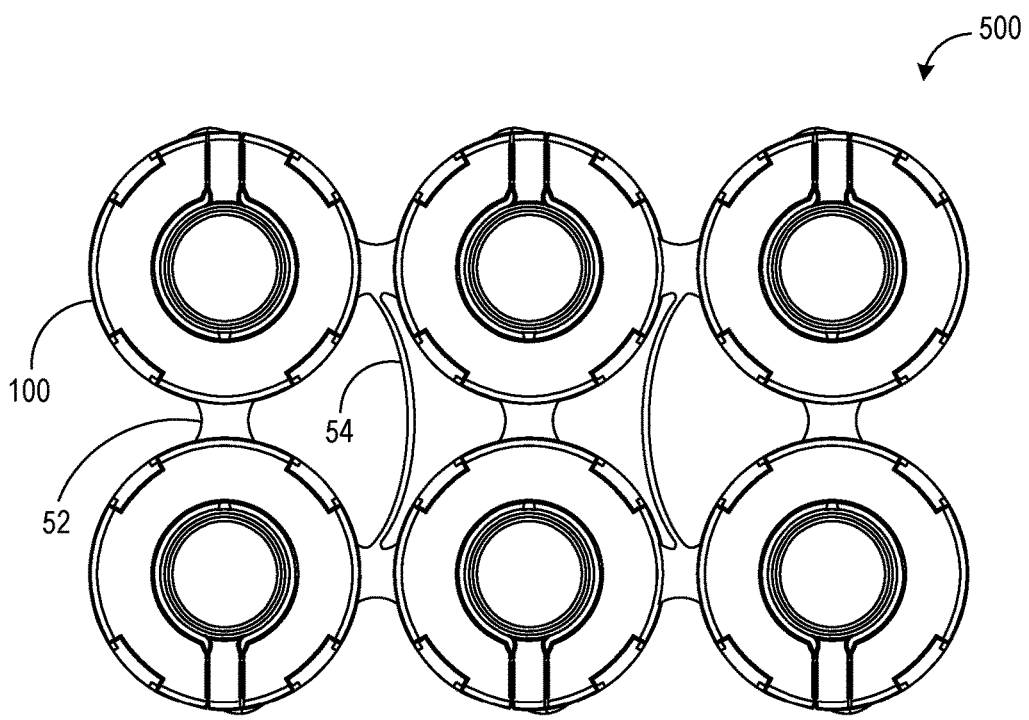
FIG. 17 shows a top view of six secure container covers joined together to form a secure container carrier.

Accordingly, examples of secure container carriers 300, 400, 500 comprising two, four, and six secure container covers 100 are shown in FIGS. 15 to 17, respectively. In the illustrated examples, each secure container cover 100 is positioned adjacent to one or more secure container covers 100 and joined via a bridge 52. The graspable loops 30 and first and second thin sections 34, 36 may be oriented to allow release of individual containers from their respective secure container covers 100, as shown in FIGS. 15 to 17. A handle 54 may be integrally formed between bridges 52 of opposite pairs of secure container covers 100 for ease of carrying the joined secure container covers 100.

While the examples in FIGS. 15 to 17 respectively show secure container carriers comprised of two, four, or six secure container covers 100, it will be appreciated that the secure container covers 100 may alternatively be joined together in groups of three, eight, or nine, for example, or any other suitable number of secure container covers 100.

Figure 18:
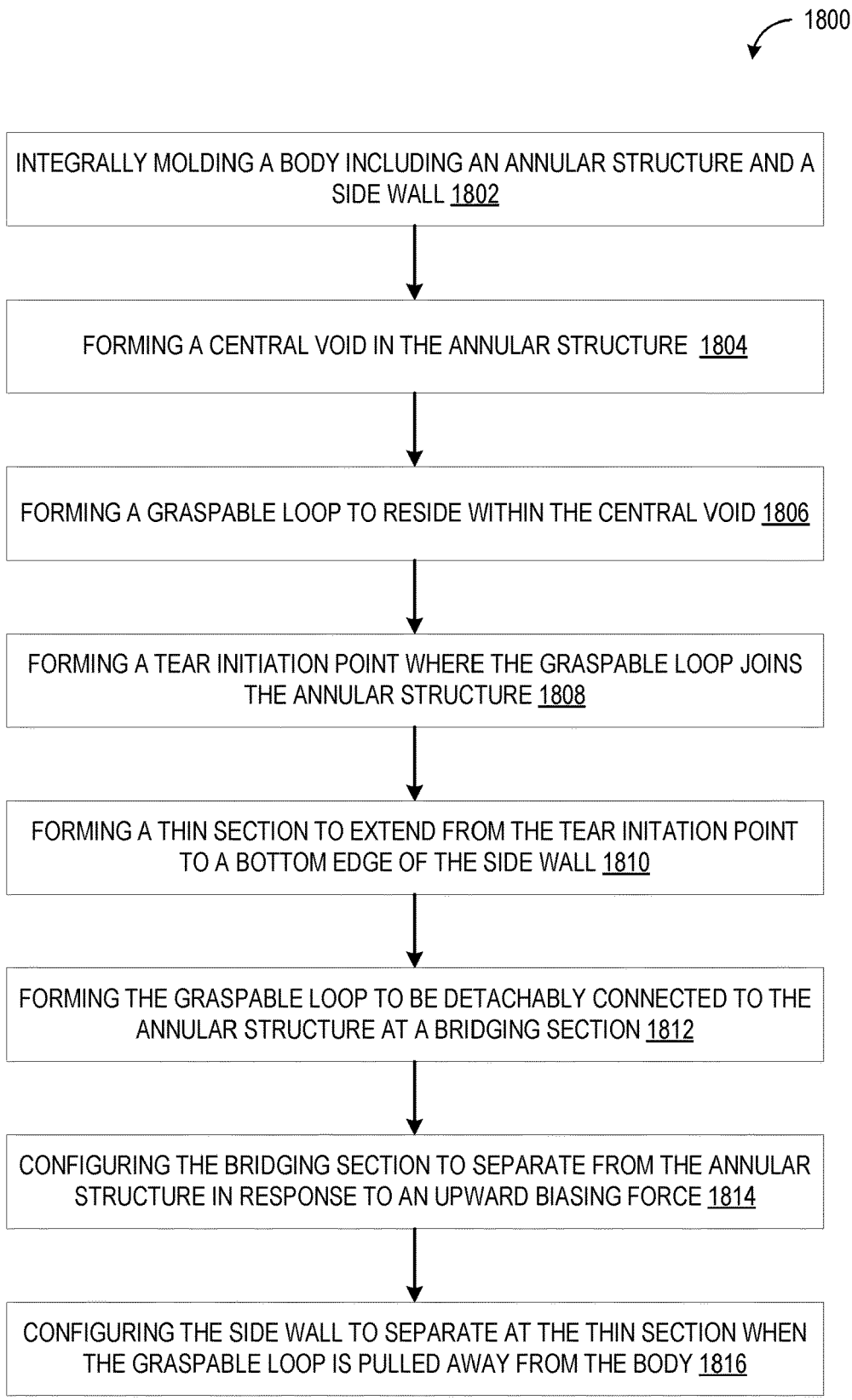
FIG. 18 shows a flowchart of a manufacturing method for a secure container cover.

FIG. 18 shows of flow chart of a manufacturing method 1800 for a secure container cover 100 for restricting access to an opening of a container. At step 1802, the method 1800 may include integrally molding a body including an annular structure and a side wall. At step 1804, the method 1800 may include forming in the annular structure a central void defined by an intermediate perimeter. At step 1806, the method 1800 may include forming a graspable loop integrally with the annular structure. The graspable loop may be configured to reside within the central void. At step 1808, the method 1800 may include forming a tear initiation point where the graspable loop joins the annular structure. At step 1810, the method 1800 may include forming a thin section to extend from a tear initiation point to a bottom edge of the side wall. As described above, the thin section may be defined by at least one channel formed in the body of the secure container cover, and a thickness of the thin section may be thinner than a thickness of the annular structure and thinner than a thickness of the side wall. At step 1812, the method 1800 may include forming the graspable loop to be detachably connected to the annular structure at a bridging section. At step 1814, the method 1800 may include configuring the bridging section to break when an upward biasing force is applied to the graspable loop. As described above, the breaking of the bridging section separates the graspable loop from the annular structure. At step 1816, the method 1800 may include configuring the side wall to separate along the thin section when the graspable loop is pulled away from the body of the secure container cover.

In any of the embodiments described herein, the body 10 of the secure container cover 100, 200 may be preferentially formed of a flexible plastic. Being both strong and lightweight, plastic is an advantageous material for use in secure container covers. It is preferable that the plastic be flexible in nature to accommodate the releasable engagement of the containers from the secure container cover. It will be appreciated that elements of the secure container cover 100, 200 described herein are designed such that the highly-engineered functionality can be accomplished without using a specialized plastic. As such, the secure container covers 100, 200 may be manufactured using a commodity resin, namely high density polyethylene (HDPE). Further the body 10 of the secure container cover 100 may be formed of post-consumer recycled (PCR) HDPE, preferably 100% PCR HDPE. It will be appreciated that secure container covers formed of flexible plastic have the additional benefit of being recyclable.

In any of the embodiments described herein, the body of the secure container cover is preferentially formed by injection molding; however, it will be appreciated that another suitable molding technique may be employed to form the body of the secure container cover.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A secure container cover for restricting access to an opening of a container comprising:
    an integrally molded body including an annular structure and a side wall, wherein the annular structure includes a central void defined by an intermediate perimeter;
    a graspable loop integrally formed with the annular structure is configured to reside within the central void;
    a first tear initiation point is formed at a first location where the graspable loop joins the annular structure;
    a first thin section extends from the first tear initiation point to a bottom edge of the side wall, the first thin section being defined by a first channel formed in the body of the secure container cover;
    a second tear initiation point is formed at a second location where the graspable loop joins the annular structure, the second location being different from the first location;
    a second thin section extends from the second tear initiation point to a tear termination point on the side wall, the second thin section being defined by a second channel formed in the body of the secure container cover;
    the side wall is configured to separate along the first thin section and the second thin section when the graspable loop is pulled away from the body of the secure container cover;
    the tear termination point is a protrusion formed on the side wall adjacent to the bottom edge of the side wall; and
    the protrusion is configured as a tear barrier that prevents further separation of the side wall along the second thin section.

2. The secure container cover of claim 1, wherein
    the first and second thin sections form a tear section therebetween, and
    the tear section is arranged equidistantly between two side wall voids.

3. The secure container cover of claim 1, wherein the first and second thin sections are arranged parallel to one another.

4. The secure container cover of claim 1, wherein
    the side wall is formed of side wall portions separated by side wall voids;
    a respective flange is positioned proximate a bottom end of each side wall void;
    the flanges are collectively configured to engage with a lip of the container to prevent an axial displacement of the secure container cover from a container.

5. The secure container cover of claim 4, wherein the side wall portions are connected by the annular structure.

6. The secure container cover of claim 1, wherein
    a bottom surface of the graspable loop is in a plane with a top surface of the annular structure, and
    a top surface of the graspable loop protrudes above a top surface of the annular structure.

7. A secure container carrier comprising:
    a plurality of secure container covers according to claim 1, wherein
    each secure container cover of the plurality of secure container covers is joined to an adjacent secure container cover via a bridge.

8. The secure container cover of claim 1, wherein
    a top surface of the annular structure includes a plurality of arcuate ribs arranged around an outer perimeter of the top surface.

9. The secure container cover of claim 1, wherein
    the body of the secure container cover is formed of post-consumer recycled high density polyethylene.

10. A manufacturing method for a secure container cover for restricting access to an opening of a container, the method comprising:
    integrally molding a body including an annular structure and a side wall;
    forming in the annular structure a central void defined by an intermediate perimeter;
    forming a graspable loop integrally with the annular structure, the graspable loop being configured to reside within the central void;
    forming a first tear initiation point where the graspable loop joins the annular structure at a first location;
    forming a first thin section to extend from the first tear initiation point to a bottom edge of the side wall, the first thin section being defined by a first at least one channel formed in the body of the secure container cover;
    forming a second tear initiation point at a second location where the graspable loop joins the annular structure, the second location being different from the first location;
    forming a second thin section to extend from the second tear initiation point to a tear termination point on the side wall, the second thin section being defined by a second channel formed in the body of the secure container cover;
    forming the side wall to separate along the first thin section and the second thin section when the graspable loop is pulled away from the body of the secure container cover; and
    forming the tear termination point to be a protrusion formed on the side wall adjacent to the bottom edge of the side wall, the protrusion being a tear barrier that prevents further separation of the side wall along the second thin section.

11. The method of claim 10, the method further comprising:
    forming a tear section between the first and second thin sections, and
    arranging the tear section equidistantly between two side wall voids.

12. The method of claim 10, the method further comprising:
    arranging the first and second thin sections parallel to one another.

13. The method of claim 10, the method further comprising:
    forming the side wall of side wall portions separated by side wall voids;
    forming a respective flange positioned proximate a bottom end of each side wall void;
    configuring the flanges to collectively engage with a lip of the container to prevent an axial displacement of the secure container cover from a container.

14. The method of claim 10, the method further comprising:
    connecting the side wall portions by the annular structure.

15. The method of claim 10, the method further comprising:
    forming a bottom surface of the graspable loop to be in a plane with a top surface of the annular structure, and
    forming a top surface of the graspable loop to protrude above the top surface of the annular structure.

16. A method for manufacturing a secure container carrier, the method comprising:
  joining together a plurality of secure container covers formed according to the method of claim 10, wherein each secure container cover of the plurality of secure container covers is joined to an adjacent secure container cover via a bridge.

17. The method of claim 10, the method further comprising:
  forming a top surface of the annular structure to includes plurality of arcuate ribs arranged around an outer perimeter of the top surface.

18. The method of claim 10, the method further comprising:
  forming the body of the secure container cover of post-consumer recycled high density polyethylene.

19. A secure container system for restricting access to an opening of a container comprising:
  a container; and
  a secure container cover comprising an integrally molded body including an annular structure and a side wall, wherein
  the annular structure includes a central void defined by an intermediate perimeter;
  a graspable loop integrally formed with the annular structure is configured to reside within the central void;
  a first tear initiation point is formed at a first location where the graspable loop joins the annular structure;
  a first thin section extends from the first tear initiation point to a bottom edge of the side wall, the first thin section being defined by a first channel formed in the body of the secure container cover;
  a second tear initiation point is formed at a second location where the graspable loop joins the annular structure, the second location being different from the first location;
  a second thin section extends from the second tear initiation point to a tear termination point on the side wall, the second thin section being defined by a second channel formed in the body of the secure container cover;
  the side wall is configured to separate along the first and second thin sections when the graspable loop is pulled away from the body of the secure container cover, to thereby release the container from the secure container cover; and
  the tear termination point is a protrusion formed on the side wall adjacent to the bottom edge of the side wall that prevents the graspable loop from detaching from the secure container cover upon release of the container.

20. The secure container system of claim 19, wherein
  the side wall is formed of side wall portions separated by side wall voids;
  a respective flange is positioned proximate a bottom end of each side wall void; and
  the flanges are collectively configured to engage with a lip of the container to prevent an axial displacement of the secure container cover from a container.

* * * * *